UNITED STATES PATENT OFFICE.

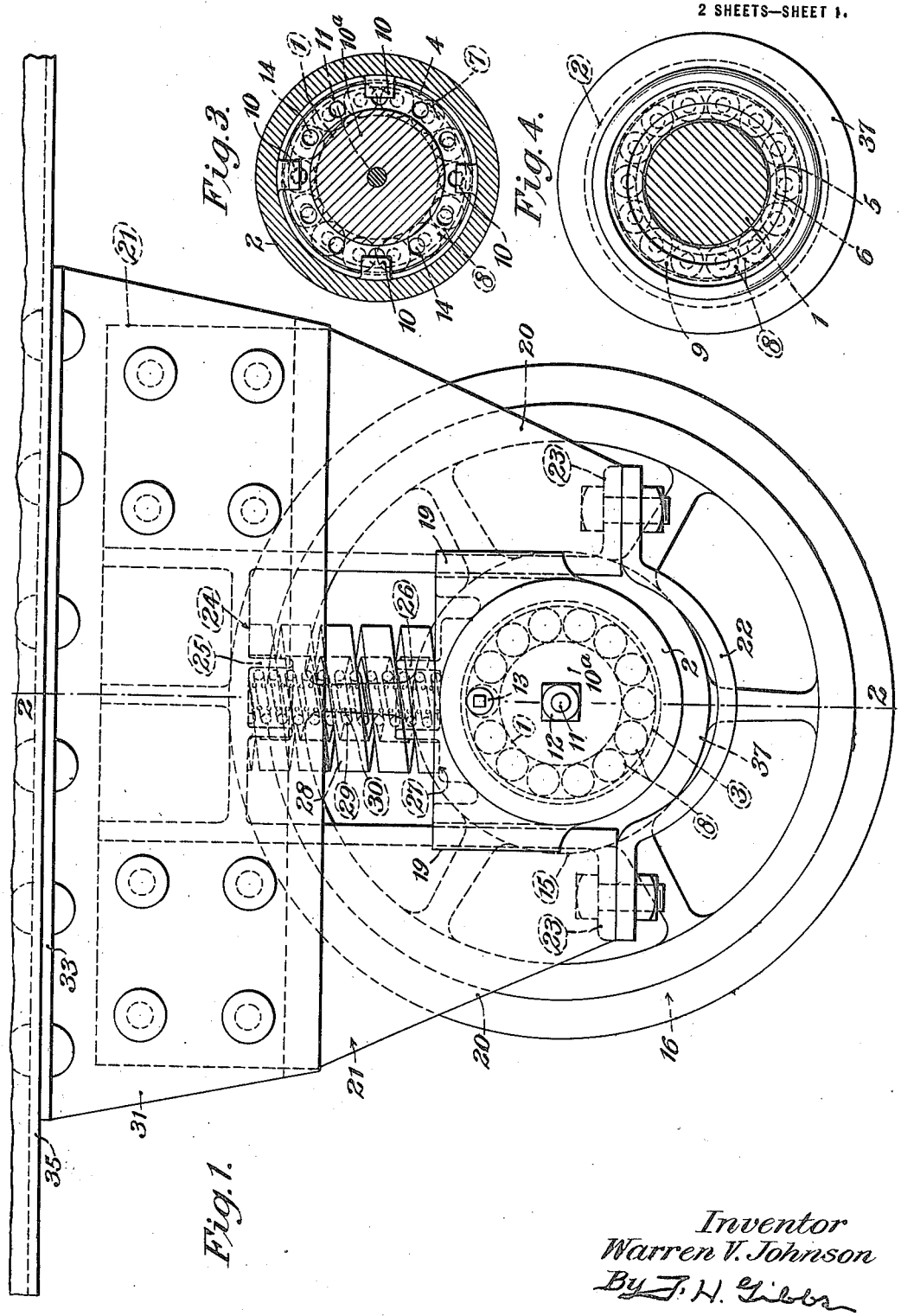

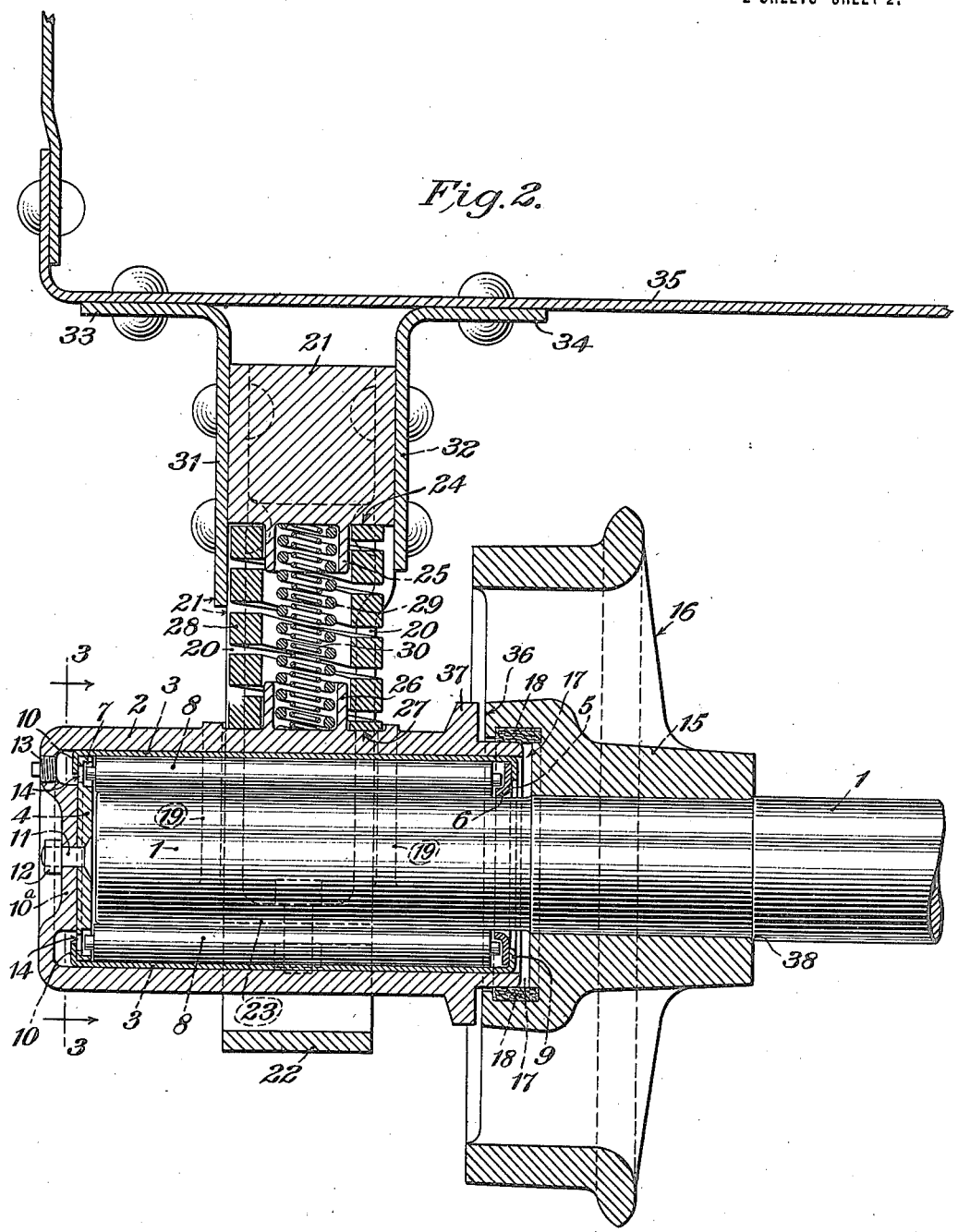

WARREN V. JOHNSON, OF BLOOMSBURG, PENNSYLVANIA, ASSIGNOR TO AMERICAN CAR AND FOUNDRY COMPANY, OF ST. LOUIS, MISSOURI, A CORPORATION OF NEW JERSEY.

MINE-CAR-RUNNING-GEAR ASSEMBLY.

1,256,135.      Specification of Letters Patent.     Patented Feb. 12, 1918.

Application filed January 15, 1917. Serial No. 142,466.

*To all whom it may concern:*

Be it known that I, WARREN V. JOHNSON, residing at Bloomsburg, Columbia county, State of Pennsylvania, and being a citizen of the United States, have invented certain new and useful Improvements in Mine-Car-Running-Gear Assemblies, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevation of the roller bearing journal box mounted in the pedestal which depends from the lower portion of a mine car body;

Fig. 2 is a vertical transverse section taken on the line 2—2 of Fig. 1;

Fig. 3 is a vertical section taken on the line 3—3 of Fig. 2 adjacent the closed end of the journal box; and Fig. 4 is an elevation of the open end of the journal box, the wheel being omitted and the axle or journal being shown in section.

The present invention relates to roller bearings for journals and suitable means for mounting the roller bearings, and it is contemplated to adapt the roller bearings for application to an axle or shaft at any convenient points thereon. When employed in connection with the running gear of mine cars, journal boxes are slidably mounted in pedestals, and into the bores of the journal box the roller bearings are inserted and reliably retained.

Each roller bearing is self-contained and may be removed from the journal box at any time when it becomes worn after long service or is unsatisfactory for any other reason, a new bearing being readily substituted.

The cylindrical rollers of the bearing are mounted to revolve freely about their axes, and, under the influence of the journal of the axle or shaft, roll without restraint about said journal.

Ordinary wheels may be mounted in common manner upon the shaft, but when used in connection with mine car running gear, appropriate association of the wheel to the journal box may be had, whereby there is a dust-proof connection between the journal box and the wheel. Also such relation may be had that neither the wheel nor the journal box will cut one into the other.

The complete assembly will be well lubricated by the means provided, lubricant being introduced into the journal box and the cylindrical rollers of the bearings carrying the lubricant about the journal that extends into the journal box, after which the oil will creep along the axle or journal and lubricate the wheel, when the latter is rotatably mounted on said axle or shaft.

Other features, including the construction of the pedestal, will become apparent hereinafter and are to be regarded as coming within the spirit and scope of the present invention.

Referring to the drawings, 1 indicates the journal of an axle upon the outer end of which is mounted a journal box 2 into which said axle or journal projects. The bore of journal box 2 is of considerably greater diameter than that of the journal and receives the roller bearing which comprises a cylindrical sleeve 3, an end bearing member 4 near the closed end of journal box 2, and a perforated collar 5 at the end of sleeve 3, which is adjacent the open end of journal box 2.

Collar 5 is shown to be in the form of a pressing that has an inwardly extending annular flange 6, while end bearing member 4 is provided with an annular runway or groove 7. A plurality of cylindrical rollers 8 are interposed between end bearing member 4 and collar 5 and are annularly arranged about the end portion of the axle or journal 1. Cylindrical rollers 8 are also provided with reduced cylindrical ends forming journals and at one end are guided by the annular flange 6 of collar 5 and at the other end project into, and are adapted to travel in the annular runway 7. Sleeve 3 at its inner end is provided with a continuous flange 9, which retains collar 5 in place, while at the outer end of sleeve 3 projections 10 extend beyond the cylindrical portion of sleeve 3 and are bent toward the axis of the sleeve to form a discontinuous flange that retains end bearing member 4 in place. It is thus evident that the roller bearing comprises sleeve 3, end bearing member 4 and collar 5 and cylindrical rollers 8, and that said roller bearings are self-contained and may be inserted or removed from journal box 2 as units whenever desired.

The self-contained roller bearings, it will be appreciated, may be located at any convenient place longitudinally of the axle or shaft 1 and are not restricted to the location shown in Fig. 2. For example, the roller bearing journal box may be on the opposite side of the wheel or there may be a pair of such boxes on each side of said wheel, it only being necessary to modify one end of the casting that forms the journal box 2 when said journal box is positioned intermediate the ends of axle or shaft 1.

In the form of journal box illustrated in Fig. 2, the outer end thereof is closed by an end wall 10$^a$ which is centrally perforated so that a lug or bolt 11, which has its head countersunk on the inner side of end bearing member 4, may pass through the closed end 10$^a$ of journal box 2 and be locked in place by a nut 12. The outer end of the shank of bolt 11 may be upset to prevent unintentional withdrawal of nut 12, or a cotter or other pin may be passed through the nut 12 and bolt 11, or merely the bolt.

It is apparent that before the journal box 2 is put into place that the roller bearing, fully assembled, may be inserted into the journal box and bolt 11 passed through the end wall 10$^a$ of the box and locked thereto by nut 12, after which the roller bearing will be properly positioned and retained within journal box 2, said journal box then being ready for receiving the journal 1. End wall 10$^a$ of journal box 2 is further perforated and threaded to receive a screw-threaded plug or other closure 13. Upon the removal of plug 13, lubricant may be introduced into the interior of journal box 2. The lubricant, during the operation of the running gear, will pass through openings 14 in end bearing member 4, after which the cylindrical rollers 8, in revolving about axle or journal 1, will carry the lubricant over the convex surface of that member. As the running gear continues in operation, the lubricant will be caused to creep along axle or journal 1 and to lubricate the same within the hub 15 of the wheel 16.

Said wheel 16 is preferably loosely mounted on axle or journal 1 adjacent the inner end of journal box 2. In some types of running gear it is customary to loosely mount a wheel at one end of the axle and to fixedly secure the wheel at the opposite end of the axle, so that what is known as a tight and loose running gear results. Where this condition is desired, the wheel 16 at one end may be loosely mounted, as stated, and at the other end it may be forced onto the axle 1 to have a press fit therewith, or it may be rigidly secured in any other appropriate manner.

The outer end of hub 15 of wheel 16 is recessed, as shown at 17, and the inner end of journal box 2, which may be of somewhat smaller diameter, is projected into recess 17. The outer end of hub 15 of the wheel is further recessed for the reception of hair-felt or other suitable packing 18 which is held against removal by the configuration of the recess it occupies, and which forms a dust-guard between wheel 16 and the inner end of journal box 2.

As best illustrated in Fig. 1, journal box 2 is provided with recessed guides 19 on opposite sides of the shell of the journal box. Journal box 2 is normally positioned between pedestal legs 20 by a lowering of the pedestal, indicated generally by numeral 21, so that the inner vertical sides of the pedestal legs 20 pass through and below the journal box guides 19. After this has happened, a pedestal tie-bar 22 may be bolted to the flanges or feet 23 at the bottoms of the pedestal legs 20. Pedestal tie-bar 22 may have an intermediate arcuate portion depressed to permit full vertical play of the pedestal 21 when it is assembled with journal box 2.

In its upper central portion pedestal 21 is provided with a seat 24 from the central portion of which depends a socket-forming wall 25. On top of journal box 2 and alined with socket-forming wall 25 is another similar socket-forming wall 26 that rises from a seat 27 on the upper part of journal box 2.

Positioned between pedestal seat 24 and journal box seat 27, and bearing against both, is a heavy compression spring 28 which surrounds the sockets 25 and 26 of the pedestal and journal box, respectively. Extending into and seated in the sockets formed by annular walls 25 and 26 are auxiliary springs 29 and 30 which coöperate with spring 28 in supporting the load imposed upon pedestal 21. This load may consist of the body of the mine car, or other vehicle, and the lading it may contain.

Riveted or otherwise secured to the outer and inner faces of the upper portion of pedestal 21, are connection members 31 and 32, which are here illustrated as being pressings, though they may have other form. Members 31 and 32 are provided with horizontal attachment flanges 33 and 34 by means of which the pedestal 21 is firmly secured to the bottom of the mine car body 35.

It will be noted that axle or journal 1 is stepped by being given successive and slightly increased diameters and that wheel 16 is incapable of moving inwardly too far by reason of a shoulder 38 formed in said axle or journal 1. Wheel 16 is also prevented from improper outward movement by having its hub 15 provided with an outer annular face 36 adapted to be engaged by an opposing face of an adjacent flange 37 preferably integral with the inner end portion of journal box 2.

From the foregoing it will be seen that I have devised a running gear assembly in which there is a journal box adapted to receive a roller bearing that is self-contained, said roller bearing including an end bearing member 4 adapted, in connection with the end wall 10 of the journal box, to sustain the end thrust of the axle or journal 1. It is also apparent that means for adequately lubricating both the journal box and wheel mounted upon axle or journal 1 has been provided for. Also, I have devised a novel pedestal which is conveniently and reliably secured to the underside of a car body.

The roller bearing is removable from journal box 2, and, should it resist withdrawal, plug 13 may be removed and a tool be inserted through the opening it usually closes, which tool may be employed to drive the roller bearing out of the journal box. To this end a plurality of openings closed by plugs 13 may be present, if desired, in the closed end of the journal box.

What I claim is:

1. In combination, an axle, a wheel mounted thereon having a hub with a recessed end portion, a journal box of larger internal diameter than said axle projecting into the wheel recess and rollers interposed between said axle and journal box holding the latter away from said axle and hub.

2. In combination, a wheel with a hub having an axle bore and a recess at one of its ends larger than said bore, an axle with a shoulder outside the opposite end of said hub, said axle passing through and beyond the recessed hub end, a journal box entered by said axle and held in the removal path of said wheel from said axle, said journal box entering the hub recess, and cylindrical rollers between said axle and journal box diametrically spacing the latter from said axle and hub.

3. In combination, an axle, a wheel mounted thereon having a hub with a recess surrounding said axle, a journal box extending into the hub recess, a roller bearing in and locked to said journal box and including cylindrical rollers diametrically separating said journal box from said axle and hub.

4. In combination, a journal box having an open end, a roller bearing adapted to be inserted therethrough into said journal box and comprising a flanged sleeve, annular roller guides retained thereby and a plurality of rollers adapted to bear on said sleeve, an axle surrounded by said rollers and having a shoulder, and a wheel on said axle having a recess into which the open journal box end projects, the wheel being held by said shoulder from movement away from said journal box.

5. In combination, a journal box having an open and a closed end, a roller bearing therein having a plurality of rollers, an axle having a shoulder and surrounded by said rollers, a recessed wheel fitting over the open journal box and substantially closing the same opposite the roller ends, and a pedestal engaging said journal box and coöperating with the axle shoulder to maintain said journal box and wheel telescoped.

6. In combination, a journal box having closed and open ends, a pedestal embracing the same, a shouldered axle entering said journal box and a roller bearing in the latter comprising an end bearing member locked to the journal box closed end and opposing the axle end, a sleeve retained by said member, rollers between said axle and sleeve, and a wheel with a recess into which the journal box open end projects to be substantially closed opposite said rollers, the pedestal and axle shoulder holding said journal box and wheel telescoped.

7. In combination, a journal box having an open end, a sleeve flanged near that end, a roller-positioning annulus retained by the flanged sleeve portion, cylindrical rollers guided by said annulus, an axle surrounded by said rollers and a recessed wheel on said axle extending over and protectively housing the open journal box end, sleeve and annulus.

8. In combination, a pedestal-supported member and a pedestal comprising a unitary member having spaced journal-box-guiding legs and an upper connector portion joining said legs, and separately formed connection members lapping sides of said connector portion below said supported member and rigidly combined therewith and attached to said supported member.

9. In combination, a car floor and a pedestal comprising a unitary member having spaced legs for guiding a journal box and an upper connector portion joining said legs, separately formed connection members rigidly united to said connector portion and forming a seat and means locking said floor to said seat.

10. In combination, an axle or shaft having a journal, a suitably mounted journal box having an open end and a stop near that end, a recessed wheel mounted on said axle or shaft and entered by the open end of said journal box, a roller bearing in said journal box provided with cylindrical rollers diametrically spacing the open journal box end from said axle and wheel and rotatable about said journal, wheel-borne means adapted to coöperate with said stop to prevent excessive telescoping of said journal box and wheel, and means preserving such telescoping.

11. In combination, an axle or shaft, a suitably mounted journal box having an open end and a stop near that end, a recessed wheel mounted on said shaft and entered by the open end of said journal box, means on said wheel coöperating with said stop to prevent excessive entrance of said journal box into said wheel, movement-limiting means preventing separation of said journal box and wheel, annular packing extending between internal and external circumferential faces of said wheel and open journal box end, respectively, and means holding the wheel-entering journal box portion in contact with said packing and out of contact with said shaft and wheel.

In witness whereof I have hereunto set my hand.

WARREN V. JOHNSON.